H. C. MILLER.
SOUND BOX.
APPLICATION FILED JAN. 28, 1907.
1,050,743.
Patented Jan. 14, 1913.
4 SHEETS—SHEET 1.
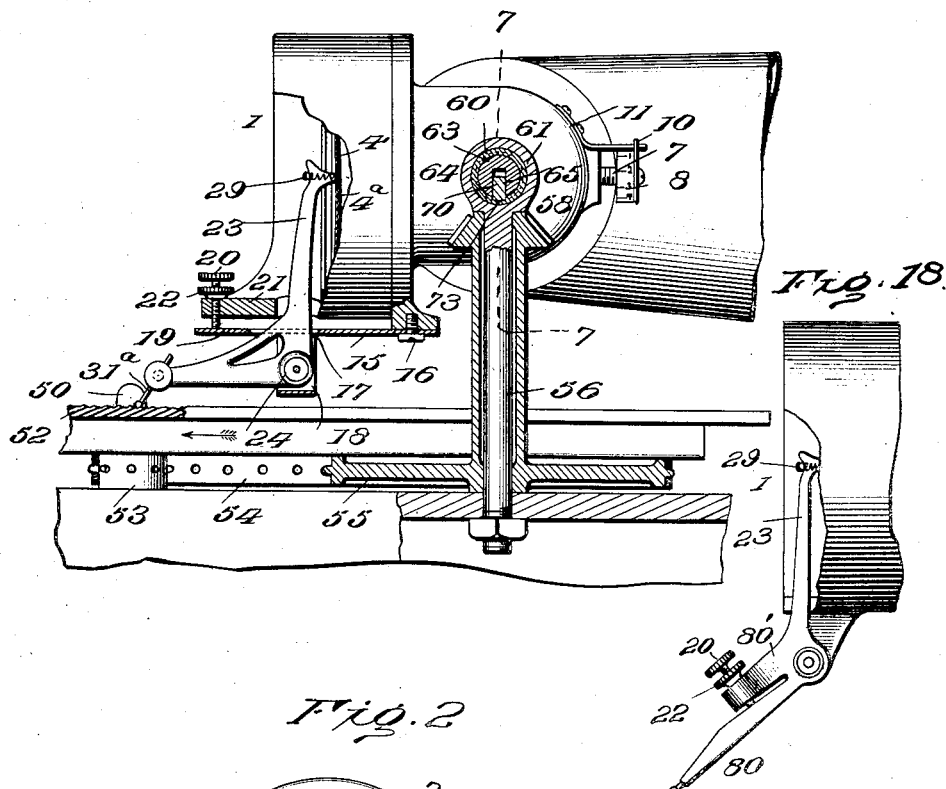
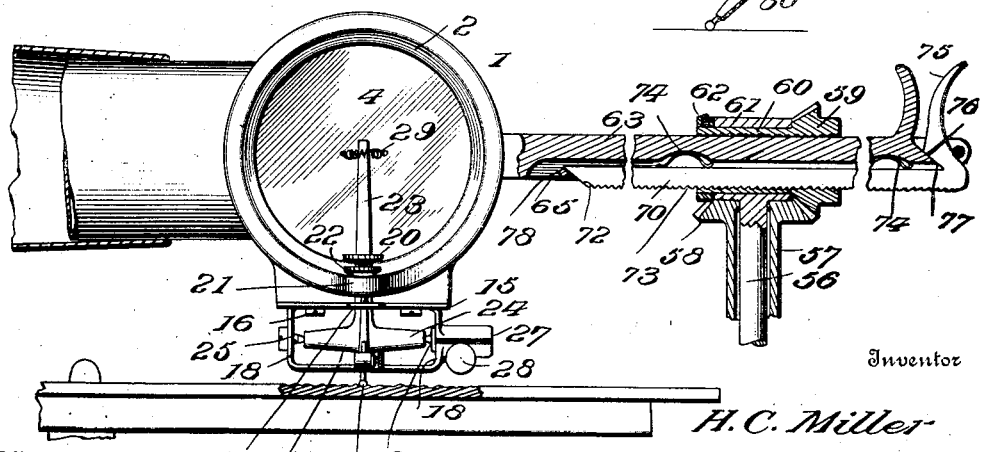
Witnesses
Inventor
H. C. Miller
Attorney H. C. MILLER.
SOUND BOX.
APPLICATION FILED JAN. 28, 1907.
1,050,743.
Patented Jan. 14, 1913.
4 SHEETS—SHEET 2.
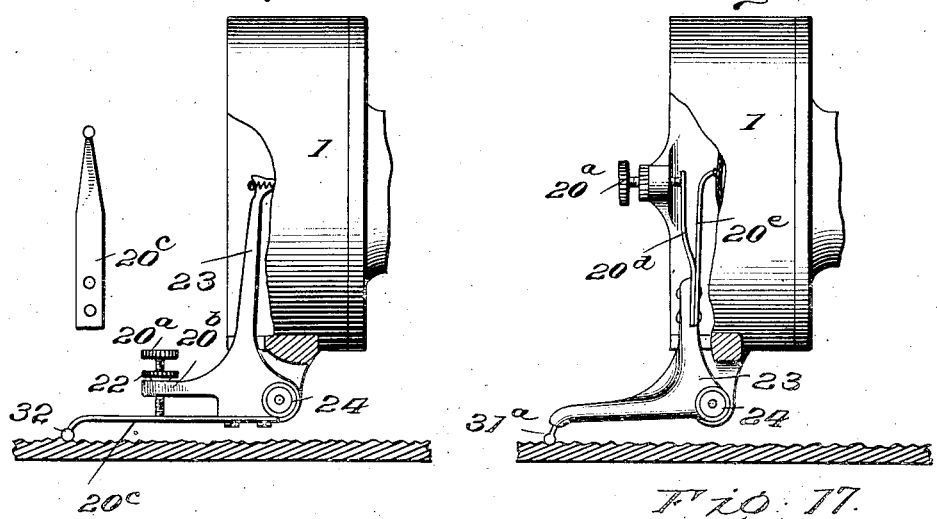
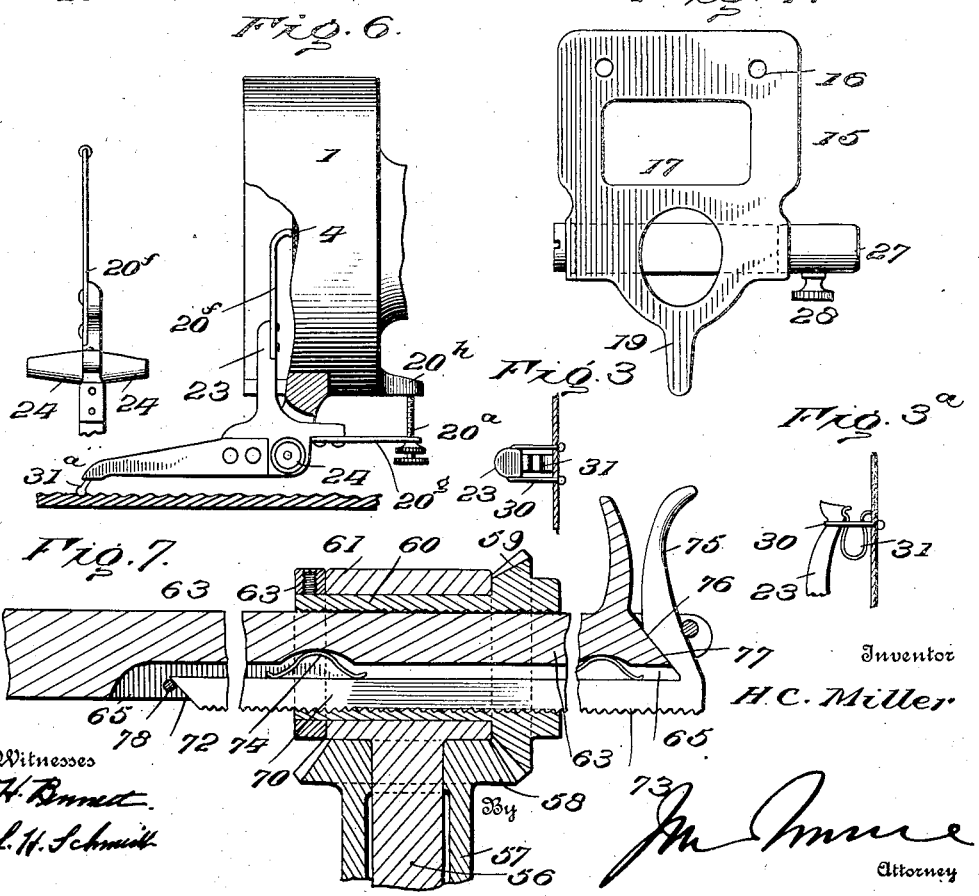

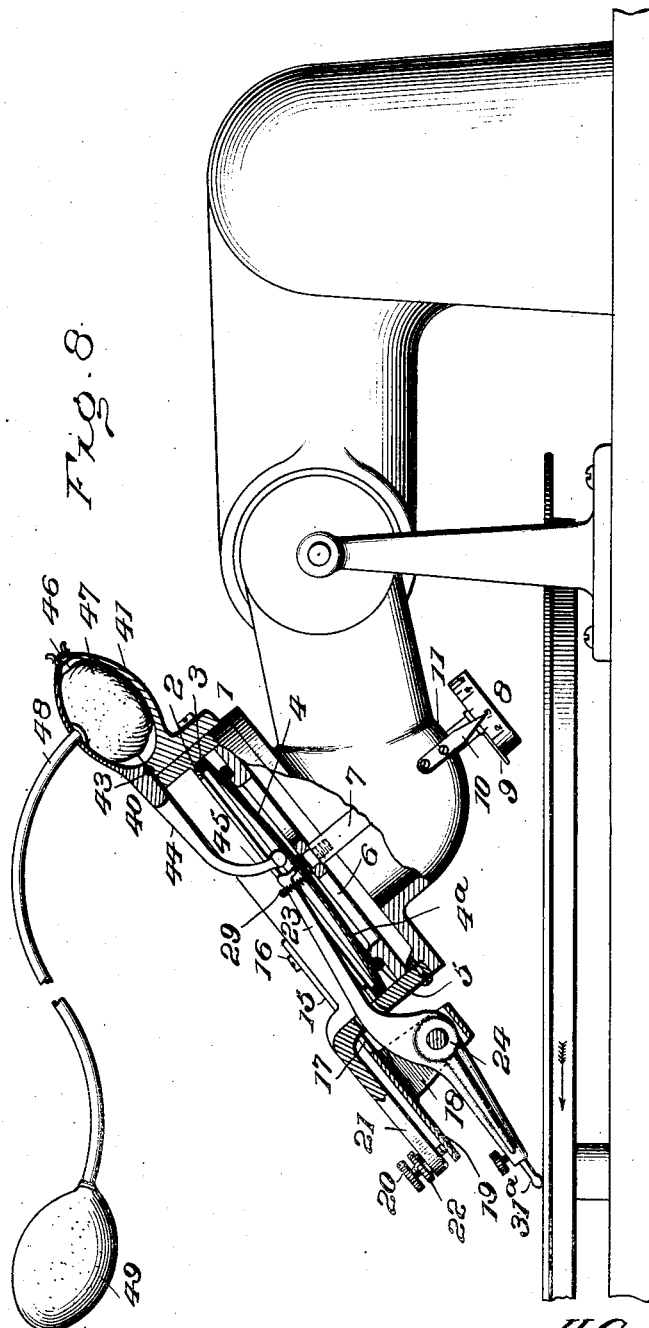

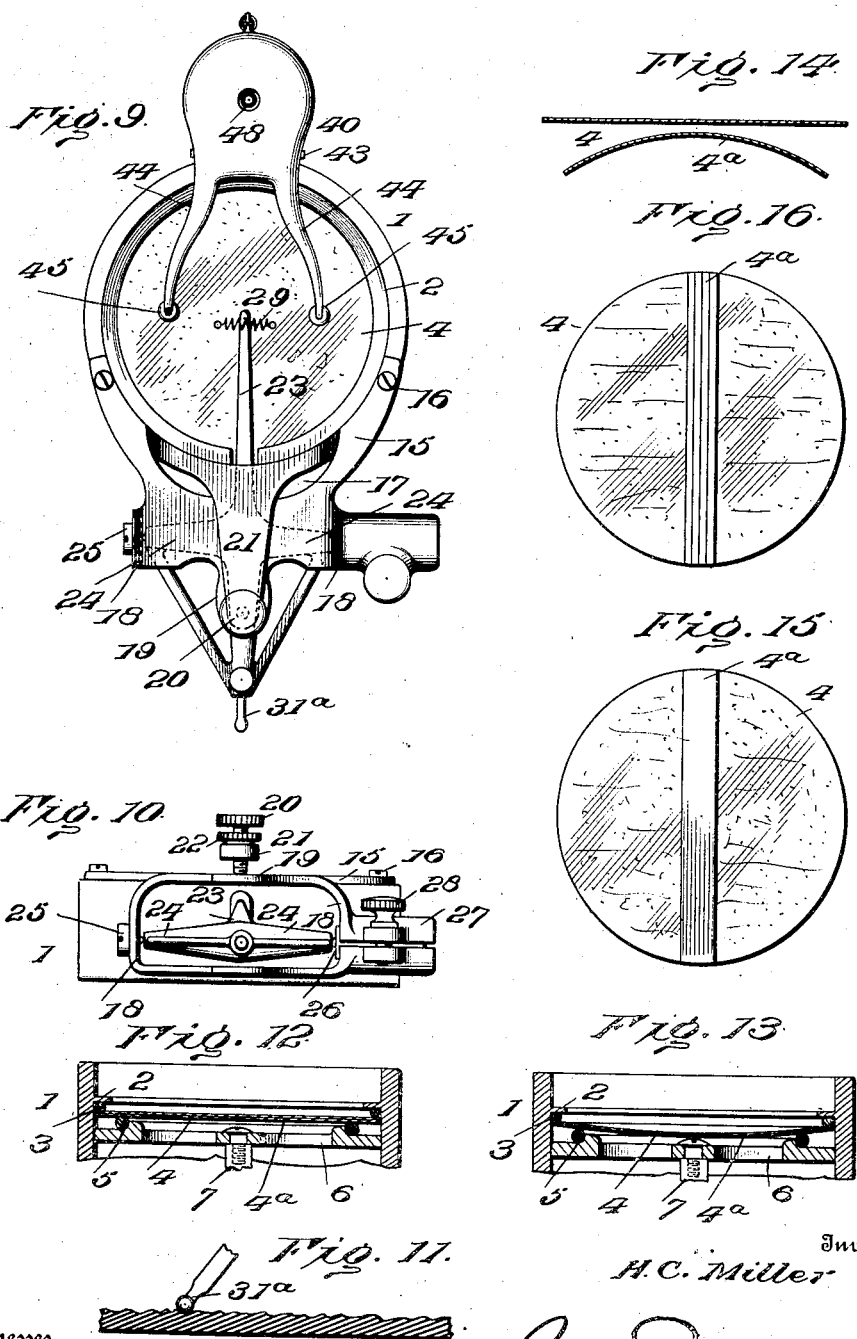

UNITED STATES PATENT OFFICE.

HENRY C. MILLER, OF WATERFORD, NEW YORK.

SOUND-BOX.

1,050,743.

Specification of Letters Patent. Patented Jan. 14, 1913.

Application filed January 28, 1907. Serial No. 354,542.

*To all whom it may concern:*

Be it known that I, HENRY C. MILLER, a citizen of the United States, residing at Waterford, in the county of Saratoga and State of New York, have invented certain new and useful Improvements in Sound-Boxes, of which the following is a specification.

This invention relates to improvements in sound boxes designed primarily to overcome rattling or blasting sounds usually present in sound boxes.

In the well-known talking machines, the stylus supports the entire weight of the sound box and frequently in addition the horn; the stylus lever being fed by the groove in the record. In other forms the sound box is fed by appropriate feeding mechanism, and in such instances guide-ways are provided to relieve the weight on the stylus point. But in the use of these constructions I have discovered defects, in that a positive fulcrum for the stylus lever is not used, resulting in the elimination of the lower sounds of a selection being reproduced.

According to my invention, I provide what I shall hereafter term recompensing means, which in effect causes the stylus to follow closely all of the vertical indentations of the record, and also prevents the stylus from jumping from one groove to the other. The details of construction of the recompense are such as to enable the stylus to recover itself from one indentation to the other, because I eliminate the rigid style structure which supports the weight of the sound box, and sometimes the horn, usually employed on other sound boxes where the whole weight of the structure is supported on the stylus. Although I do not show it in the drawing, the horn may be directly connected to the sound box, in which case the stylus supports the sound box and the horn; my invention even then compelling the stylus to be always in perfect contact with the projections or undulations of the groove thereby rendering the reproduction natural. Without the use of a recompense device it would not be possible for a stylus to support the weight of the sound box without the use of some resilient means between the stylus and the sound box, as the stylus would jump from one bold projection to the other without reaching the indentation of the groove and perhaps jump out of the groove entirely. I accomplish these objects by supporting the sound box on the stylus and providing a resilient recompense on said stylus, or in other words the stylus resiliently hangs from the sound box. I also provide a positive fulcrum for the stylus lever, in combination with a recompense, and means for adjusting the latter.

Other objects and advantages will be hereinafter referred to and particularly pointed out in the claims.

In the drawings: Figure 1 is an elevation partially in section of my improvement applied to a talking machine of the type where the sound box is adapted to be moved over the surface of a record by means of a feed screw. Fig. 2 is a front elevation of the same. Fig. 3 is a detail horizontal section of a means for connecting the stylus lever to the diaphragm. Fig. 3ª is a side elevation of the same. Figs. 4, 5, and 6, represent different forms of the application of my improvement to sound boxes. Fig. 7 is a detail sectional view on the line 7—7 of Fig. 1. Fig. 8 is a side elevation partially in section of my improved sound box applied to a talking machine of the type where the record groove moves the stylus over its surface. Fig. 9 is a face view of the same. Fig. 10 is an edge view. Fig. 11 is an enlarged detail section of a stylus and a portion of the record. Fig. 12 is a detail horizontal sectional view of the sound box, the diaphragm being flattened. Fig. 13 is a similar view illustrating the normal position of the diaphragm. Fig. 14 is a detail section of a straight diaphragm and a covered tuning element ready to be applied to the former. Fig. 15 is a view of the diaphragm with the modifying element applied thereto. Fig. 16 is a similar view showing the modifying element composed of a series of strips. Fig. 17 is a detail view of the recompense. Fig. 18 is a sectional view of a modification.

Referring particularly to Figs. 1, 2, and 6; 1, indicates a sound box, preferably of hard rubber, and 2, a flange therein against which bears a resilient washer 3, to support a dished diaphragm 4. A washer 5, of less diameter than the washer 3, bears against the opposite side of the diaphragm and is supported by a spider 6, the latter being swiveled to a threaded stem 7, provided with a head 8, with indicating characters on its periphery, and a stop 9. A pointer 10, secured on a projection 11, on the sound box, coöperates with the characters on the head 8, to indicate the adjustment of the dished diaphragm for playing a particular selection. A thin plate 15, is secured to the sound box at 16, and is provided with an opening 17, ears 18, and a bar connecting the latter. Extending outwardly from the plate 15, is a spring tongue 19, against which an adjusting screw 20, bears, said screw being mounted in an extension 21, on the sound box 1, and held in set position by a locknut 22. Between the ears 18, is pivotally mounted the stylus lever 23, which has extensions 24; one receiving a screw 25, in one of the ears and the other receiving a spring pressed pin 26, in an extension 27, on the other ear, and adapted to be held in fixed position by a set screw 28. The end of the stylus lever rests against the face of the diaphragm and is held in contact therewith by a spring or other yielding connection 29, secured to the diaphragm and passing over the outer edge of the lever, as shown particularly in Figs. 1, and 2. This connection may be varied somewhat as shown in Figs. 3 and 3ª, wherein a piece of catgut 30, is secured to the diaphragm and it passes around the stylus lever, and interposed between the latter and the diaphragm is a light spring 31. By this construction it is evident that the stylus 31ª, will recover itself quickly in passing from one indentation or projection of the groove in the record to the other, due to the fact that the adjustment of the bearings for the stylus lever are supported by a resilient plate fastened to the sound box and the connection of said lever with the diaphragm is such, as will effectually relieve the strain incident to the direct weight of the sound box. Furthermore, the necessary downward pressure of the stylus in the record groove, can be minutely adjusted by manipulation of the set screw 20, to increase or decrease the tension on the tongue 19, of the spring plate 15. The stylus lever is constructed of wood, which in combination with a hard rubber sound box casing enables me to obtain exceedingly satisfactory results.

In Figs. 4, 5, and 6, the mounting of the stylus lever is somewhat differently arranged, but the same generic principle is preserved. For instance, in Fig. 4, the set screw 20ª, is mounted on an extension 20ᵇ, of the stylus lever, said screw bearing upon a spring tongue 20ᶜ, which carries the stylus 32. In Fig. 5, the set screw 20ª, extends through a lug extending inwardly from the sound box, and bears on a light spring 20ᵈ, extending from the stylus lever, and another light spring 20ᵉ, also extending from the stylus lever bears directly on the diaphragm. In Fig. 6, the stylus lever is provided with a light spring 20ᶠ, which bears on the diaphragm, while a spring tongue 20ᵍ, extends from the rear of said lever and the adjusting screw 20ª, bears on a lug, 20ʰ, extending from the sound box. In each of the constructions shown in Figs. 4, 5, and 6, the same substantial results can be obtained as with the form of my invention shown in Figs. 1 and 2.

Referring to Figs. 8, 9, and 10, the construction of the mounting for the stylus lever is substantially the same as that shown in Figs. 1, and 2, except its form is somewhat changed to adapt it to an angularly disposed sound box. In connection with the means of mounting the stylus lever I have found results can be obtained by the employment of a normally concavo-convexo diaphragm, preferably formed of wood, and having applied to it a modifying element 4ª located across the grain, and whose normal tendency is such as to dish the diaphragm. The diaphragm when the modifying element is first applied, is considerably higher in pitch than may be required. The pitch of the diaphragm may be reduced while on the sound box by peeling, or sandpapering the modifying element. It is obvious that the modifying element may be formed of a series of strips, such for instance as shown in Fig. 16, in which case the pitch or tune of the diaphragm may be altered by removing one or more of said strips. When operating the sound box the pitch may be modified by turning the threaded stem 7, to flatten the diaphragm throughout its entire area, caused by the engagement of the washer 5, pressing it interior of the washer 3. It is well known that the tension on and altering of the face form of a diaphragm materially affects the sound reproduced, and I find superior results are obtained by having it normally dished, and then flattening it.

40, indicates a sound dampener, shown particularly in Figs. 8 and 9, and comprises a cup-shaped member 41, on the sound box, and a similar cup-shaped member hinged at 43, and provided with two fingers 44, bent to provide buffers 45, and designed to contact with the diaphragm; a slight spring 46, causing the two members to be drawn together. The cup-shaped members form a pocket for a bulb 47, connected by a pipe 48, with a bulb 49, designed to be held in the hand of the operator. When it is desired to dampen the sound to produce effects necessary in the reproduction of certain selections, the bulb 49, is slightly squeezed and the buffers or points 45, are caused to engage the diaphragm until the effect on the reproduction is obtained. For instance, to soften the sound the buffers are caused to contact with the diaphragm, while for loudness pressure on the diaphragm is relieved.

Referring to the construction shown in Fig. 1, 50, indicates a post to receive the record 52, and it has fixed to it a sprocket-wheel 53, around which a leather belt 54, passes, which also passes around a sprocket-wheel 55, mounted on a shaft 56. A sleeve 57, extends from the sprocket wheel 55, and at its upper end is a beveled gear wheel 58, which meshes with a beveled gear 59, formed on an internal threaded sleeve 60. The sleeve 60, is mounted in a bearing 61, on the upper end of the rod 56, and is held in place by a collar 62. A supporting rod 63, extends outwardly from a tube 64, connected to the sound box 1, and this rod is provided with a groove 65, in which slides a rod 70, beveled at one end at 72, and provided on its lower end with threads 73, adapted to engage the threads on the internally threaded sleeve, and normally held in engagement therewith by springs 74. The end of the rod 70, is provided with a handle 75, inclined on its lower end at 76, to engage a similar inclined surface 77, on rod 63, which, together with a pin 78, extending across the groove 65, will permit of the elevating of the threaded bar to disengage it from the internal threads of the sleeve 60, and thereby allow of the sound box being returned to normal position, after a selection has been reproduced.

Where diaphragms of unusually large diameters are to be used, my present invention is particularly applicable. Under this condition it is essential that the stylus lever be long, but this matters not in so far as results are concerned, because of the fact that the direct strain on the record is relieved by my improved form of recompense.

The means shown for holding the stylus lever to the diaphragm is of importance in my improved sound box. The point of the stylus lever contacting with the diaphragm is not of a permanent nature which would necessitate of a record lifting the entire weight of the sound box, but on the contrary the stylus yields to allow the parts to elastically carry the vibrations from the record to the diaphragm without causing the usual rattling noise, incident to an ordinary link or other positive connection. This feature possesses another advantage in that it permits of the diaphragm being readily removed for repairs or change of parts. This construction is also quite essential, inasmuch as the stylus must at all times maintain a determinate position, so, when the diaphragm is dished or straightened, the necessary relative location of the parts will at all times be maintained, and at the same time strain is obviated.

From the foregoing description taken in connection with the accompanying drawings it will be seen, I have a sound box supported by a stylus, with a resilient recompense on said stylus; a stylus resiliently hung from the sound box, the resilient means supporting the whole or part of said sound box; the stylus supporting the recompense and the sound box.

While I have specifically mentioned a record having a groove with vertical projections and indentations it is evident my invention may be employed in connection with a grooved record of the ordinary lateral undulating groove.

It is evident many minor changes may be made without departing from the spirit and scope of my invention, as for instance instead of pivotal fulcrums I may employ knife or spring fulcrums.

In Fig. 18, I have shown a different form of my invention. The lower part of the stylus lever is split to provide a spring member 80, and the screw 20, is mounted in the upper member 80′, of said lever. This construction produces a recompense of the same general principle disclosed in Fig. 4.

What I claim is:

1. A sound box comprising a diaphragm, a resilient member secured to the sound box and carrying bearings, a stylus lever pivotally mounted in the bearings to permit movement of the stylus independent of the movement by the resilient member, said stylus lever bearing on the diaphragm, and means bearing on the resilient member to increase or decrease the tension on said member at right angles to the movement of the stylus lever by the diaphragm.

2. A sound box comprising a diaphragm, a stylus lever, yielding means secured to the diaphragm and passing around the stylus lever to hold the latter in contact with the former.

3. A sound box comprising a diaphragm, a stylus lever, yielding means secured to the diaphragm and passing around the stylus lever to force the latter toward the diaphragm, and a yielding connection between the stylus lever and the sound box.

4. A sound box comprising a concavo-convex diaphragm, means independent of the stylus lever for flattening the diaphragm, a stylus lever coöperating with the diaphragm, a resilient means for holding one end of the stylus lever in contact with the diaphragm.

5. A sound box comprising a convex diaphragm, means for flattening the diaphragm, a stylus lever, and a resilient connection between the diaphragm and the stylus lever to hold one end of the latter in contact with the diaphragm.

6. A sound box comprising a concavo-convex diaphragm, a plurality of parallel strips extending across the face of the diaphragm and permanently secured thereto throughout their entire length, and a stylus lever coöperating with the diaphragm.

7. A sound box comprising a concavo-convex diaphragm, having attached thereto a modifying element extending diametrically over the face thereof and secured thereto throughout its entire length, and a stylus lever coöperating with the diaphragm.

8. A sound box comprising a concavo-convex diaphragm having attached thereto a modifying element extending diametrically across the face thereof and secured thereto throughout its entire length, a stylus lever coöperating with the diaphragm and resilient means for holding one end of the stylus lever in contact with the diaphragm.

9. A sound box comprising a concavo-convex diaphragm, a modifying element attached to and extending over the face thereof and normally tending to dish the diaphragm, and a stylus lever coöperating with the diaphragm.

10. A sound box composing a wooden concavo-convex diaphragm, a modifying element attached to and extending diametrically over the face of the diaphragm and secured thereto throughout its entire length, and a yielding stylus lever coöperating with the diaphragm.

11. A sound box comprising a diaphragm, a modifying element composed of a plurality of sections attached thereto, and extending diametrically across the face of the diaphragm and secured thereto throughout its entire length, and a stylus lever coöperating with the diaphragm.

12. A sound box comprising a diaphragm and a stylus lever, a dampener including a buffer to bear on the diaphragm, a pneumatic device for operating the buffer including a bulb located at a point distant from the sound box and a connection between the bulb and buffer, whereby upon operation of the bulb, the buffer may be operated to change the tone of the diaphragm during the reproduction of a selection.

13. A sound box comprising a concavo-convex diaphragm, a modifying element attached to and extending diametrically across the face of the diaphragm, a washer against which the diaphragm rests, a second washer on the opposite side of the diaphragm and smaller in diameter than the first mentioned washer, a spider supporting the second washer, means for forcing the spider toward the first washer to flatten the diaphragm, a stylus lever coöperating with the diaphragm, a resilient connection between the latter and the stylus lever, and a resilient connection between the sound box and the stylus lever to permit movement of the latter independent of the former.

14. A sound box, comprising a casing, a diaphragm in the casing, a stylus lever, resilient means for securing the stylus lever to the casing to permit the point of the stylus lever to move slightly over the face of the diaphragm, means connecting the stylus lever and the diaphragm to permit the slight movement of said stylus, and means for regulating the tension of the resilient means.

15. A sound box comprising a casing, a diaphragm in the casing, a stylus lever, a resilient connection supported by the casing, means pivotally connecting the stylus lever to the resilient connection to permit the stylus lever to rock, and means holding the point of contact of the stylus lever against the diaphragm, but permitting said stylus lever to be moved slightly over the face of the diaphragm by movement of the resilient connection, and means for regulating the tension of the resilient connection.

16. A sound box comprising a casing, a diaphragm in the casing, a stylus lever, a resilient element connected to the casing and having bearings, means pivotally supporting the stylus lever in the bearings, and a connection between the stylus lever and the diaphragm which will permit movement of the stylus lever by the resilient connection independent of the movement of the diaphragm.

17. A sound box, comprising a diaphragm, a stylus lever, yielding means secured to the diaphragm and passing around the stylus lever to hold the latter in contact with the former, and a resilient element secured to the sound box to which the stylus lever is pivoted.

18. A sound box comprising a diaphragm, a modifying element attached thereto and extending diametrically across the face of the diaphragm, and secured thereto throughout its entire length, a stylus lever coöperating with the diaphragm and a spring secured to the diaphragm and extending around the stylus lever to hold the end of the latter in contact with said diaphragm.

19. A sound box comprising a diaphragm, a modifying element attached diametrically across the face of the diaphragm and secured thereto throughout its entire length, a stylus lever coöperating with the diaphragm, resilient means for holding the stylus lever in contact with the diaphragm, and means independent of the resilient means for increasing or decreasing the frictional contact of the stylus lever with the diaphragm.

20. A sound box comprising a diaphragm, a stylus lever, yielding means passing around the stylus lever, and secured to the diaphragm to hold the said lever in contact with the diaphragm.

21. A sound box comprising a diaphragm, a stylus lever, yielding means secured to the diaphragm, and passing around the stylus lever to force the latter toward the diaphragm, and a yielding connection between the stylus lever and the sound box.

22. A sound box comprising a diaphragm, a modifying element attached thereto and extending diametrically across the face of the diaphragm, and secured thereto throughout its entire length, a stylus lever coöperating with the diaphragm, a yielding connection between the stylus lever and the diaphragm, and means for altering the cross sectional shape of the diaphragm including the reinforcing element.

23. A sound box comprising a diaphragm, a stylus lever coöperating with the diaphragm, yielding means for holding the stylus lever against the diaphragm, means independent of the stylus lever for altering the cross sectional shape of the diaphragm, and means extending across the face of the diaphragm for reinforcing the latter, said means being permanently secured to the face of the diaphragm.

24. A sound box comprising a concavo convex diaphragm, a modifying element attached to and extending over the face thereof, and normally tending to dish the diaphragm, a stylus lever coöperating with the diaphragm, and means operating on the diaphragm for altering its cross sectional shape to change its tone during the period of reproducing a selection.

25. A sound box comprising a casing, a diaphragm, a stylus lever, a flat spring plate formed with an opening and secured to the casing, and having bearings, the stylus extending through the openings in the flat spring plate and mounted in the bearings, and an adjusting element on the casing to regulate the tension of the flat spring plate.

In testimony whereof I have signed my name to this specification in the presence of two subscribing witnesses.

HENRY C. MILLER.

Witnesses:
F. F. FOLLET,
GEORGE H. COLE.